US010619965B1

(12) United States Patent
Deichert et al.

(10) Patent No.: US 10,619,965 B1
(45) Date of Patent: Apr. 14, 2020

(54) BIPOD LEG RELEASE LEVER

(71) Applicants: Ty Raymond Deichert, Thornton, CO (US); Richard W. Deichert, Broomfield, CO (US)

(72) Inventors: Ty Raymond Deichert, Thornton, CO (US); Richard W. Deichert, Broomfield, CO (US)

(*) Notice: Subject to any disclaimer, the term of this patent is extended or adjusted under 35 U.S.C. 154(b) by 0 days.

(21) Appl. No.: 16/533,485

(22) Filed: Aug. 6, 2019

Related U.S. Application Data

(60) Provisional application No. 62/723,085, filed on Aug. 27, 2018.

(51) Int. Cl.
| | | |
|---|---|---|
| *F41A 23/10* | (2006.01) | |
| *F16B 7/14* | (2006.01) | |
| *F16M 11/26* | (2006.01) | |

(52) U.S. Cl.
CPC ............ *F41A 23/10* (2013.01); *F16B 7/1481* (2013.01); *F16M 11/26* (2013.01)

(58) Field of Classification Search
CPC .......... F41A 23/00; F41A 23/04; F41A 23/06; F41A 23/08; F41A 23/10; F41A 23/12; F41A 23/14; F41A 23/16; F41A 23/18; F16B 7/1481; F16M 11/26
See application file for complete search history.

(56) References Cited

U.S. PATENT DOCUMENTS

| | | | | |
|---|---|---|---|---|
| 4,625,620 A * | 12/1986 | Harris | ..................... | F41A 23/08 42/94 |
| 5,887,835 A * | 3/1999 | Hein | ..................... | F16M 11/26 248/161 |
| 6,082,685 A * | 7/2000 | Hein | ..................... | F16M 11/26 248/161 |
| 7,631,455 B2 * | 12/2009 | Keng | ..................... | F16M 11/10 248/163.1 |
| 7,954,272 B2 * | 6/2011 | Potterfield | ............. | F41A 23/10 248/125.8 |
| 10,408,555 B2 * | 9/2019 | Flood, Jr. | ................ | F41A 23/10 |
| 2009/0000175 A1 * | 1/2009 | Potterfield | ............. | F41A 23/10 42/94 |
| 2015/0362278 A1 * | 12/2015 | Genchel | .................. | F41A 23/10 42/94 |
| 2016/0273863 A1 * | 9/2016 | Hayes | ..................... | F41A 23/08 |
| 2017/0167817 A1 * | 6/2017 | Hayes | ..................... | F41A 23/10 |
| 2017/0299317 A1 * | 10/2017 | Chen | ...................... | F41A 23/10 |
| 2018/0202746 A1 * | 7/2018 | Flood, Jr. | ................ | F41A 23/10 |

* cited by examiner

*Primary Examiner* — Benjamin P Lee
(74) *Attorney, Agent, or Firm* — Patent Law Offices of Rick Martin, P.C.

(57) ABSTRACT

A bipod for a rifle traditionally has a release button/bracket in the front of the adjustable leg. To release the adjustable leg the shooter must reach forward and push the button/bracket. This forces the shooter to lose the aligned shooting position on the target. The present invention provides a rearward facing lever that the shooter can depress with his free arm while maintaining the shooting position and his finger on the trigger. The lever can be folded up to a neutral position for use in the prior art fashion or for storage. The lever has a pivot arm that pulls the stopper in a ring bracket rearward out of the traditional locking grooves located along the adjustable leg. The invention is suited for either a retrofit or factory new embodiment.

17 Claims, 7 Drawing Sheets

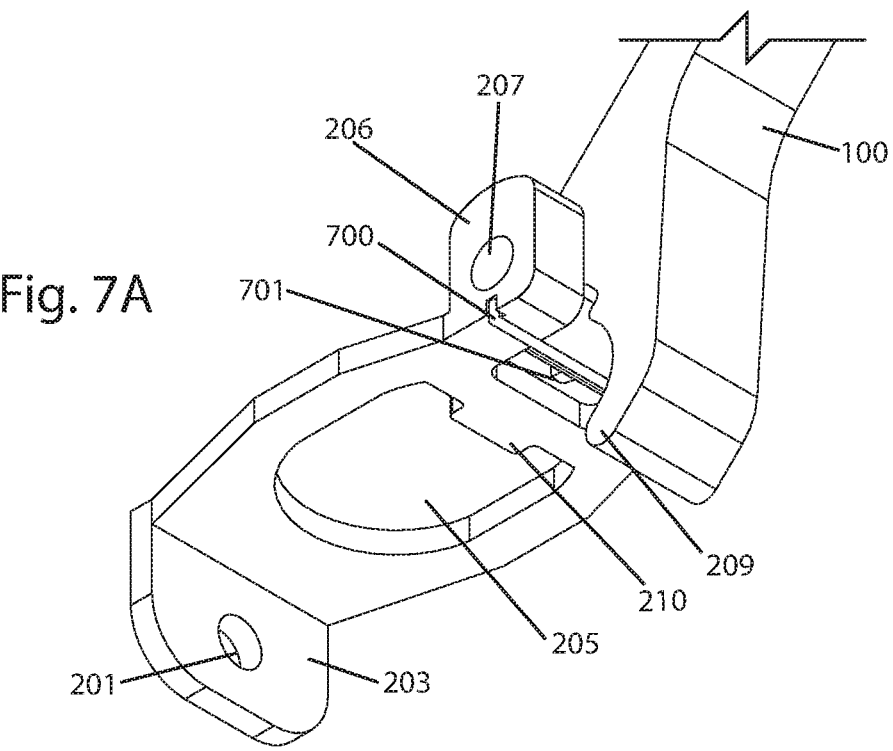
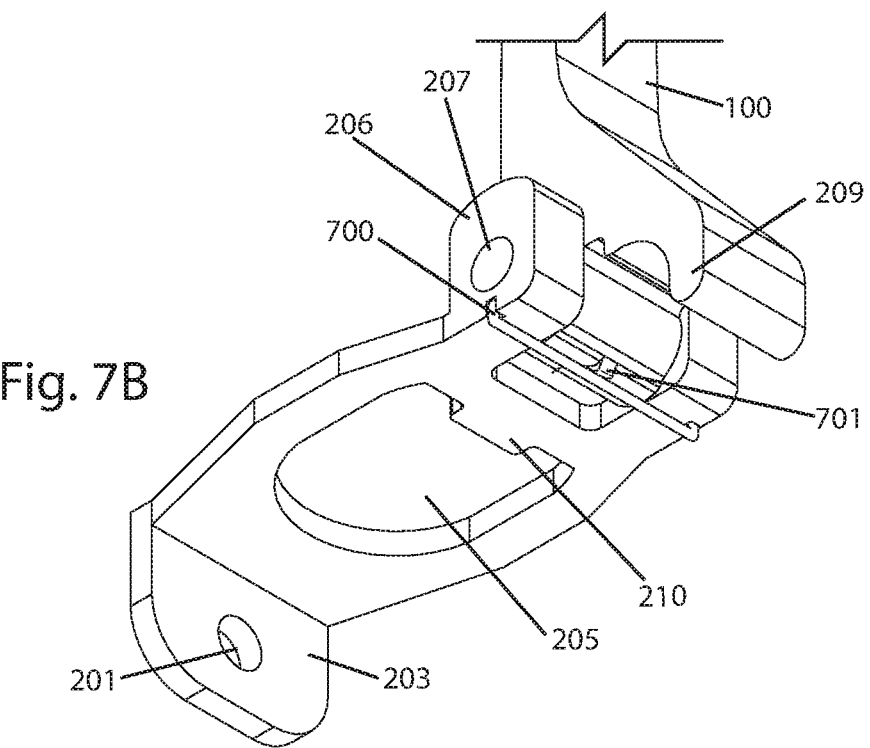

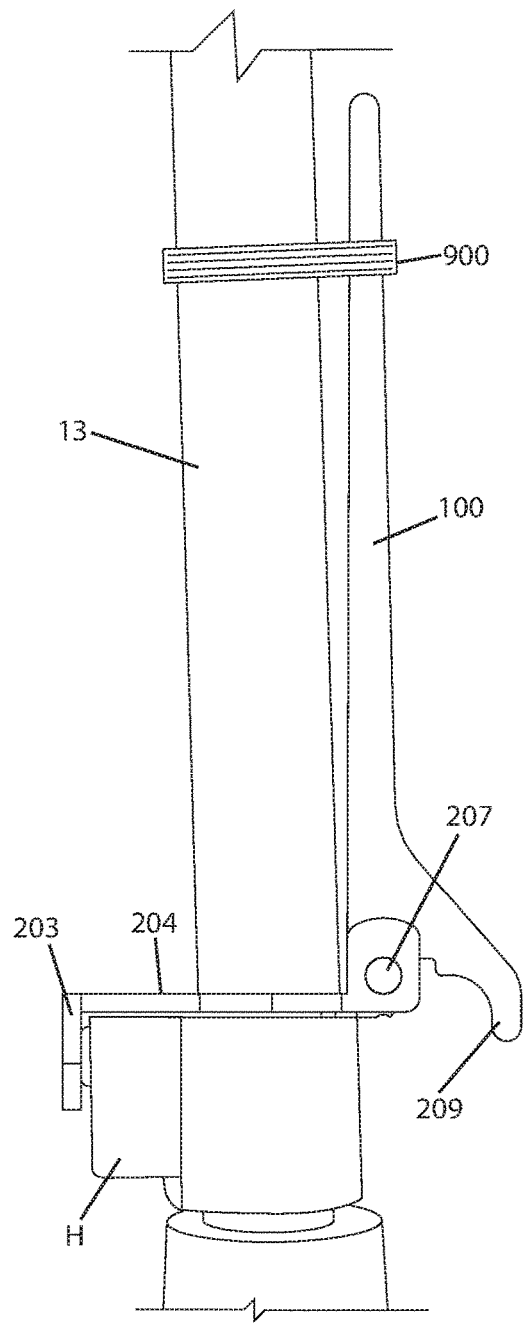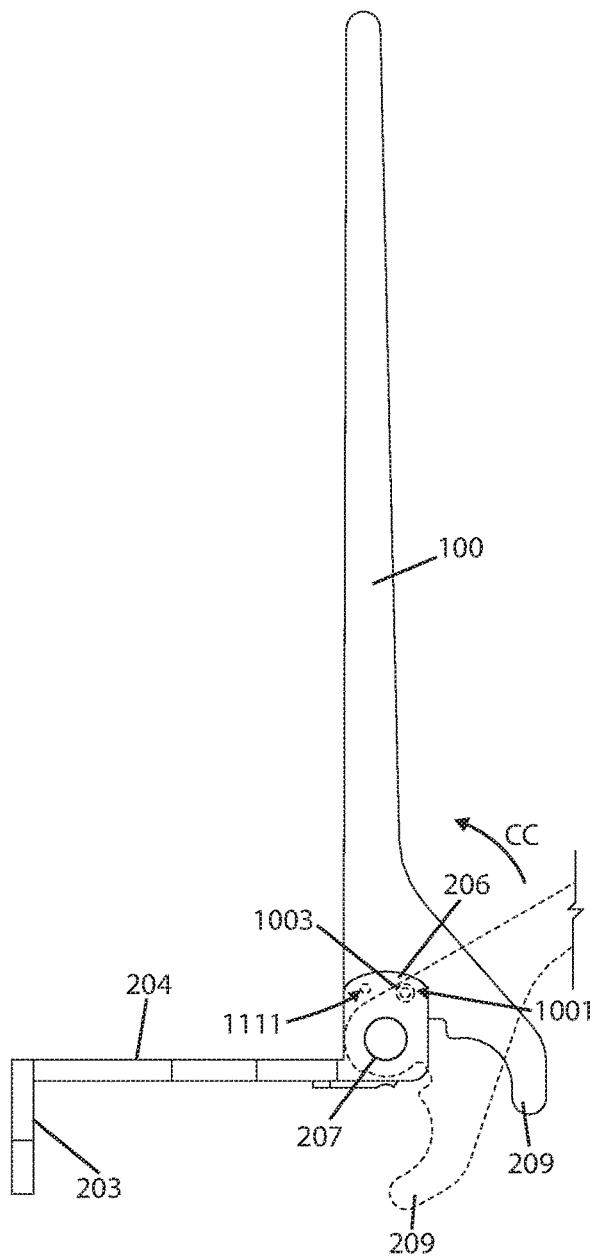
Fig. 9
Fig. 10

BIPOD LEG RELEASE LEVER

CROSS REFERENCED PATENTS

This non-provisional application claims benefit of provisional application Ser. No. 62/723,085 filed Aug. 27, 2018 which is incorporated herein by reference in its entirety.

FIELD OF THE PRESENT INVENTION

The present invention relates to providing a rearward facing lever on a bipod frame to enable a rifle shooter to more easily adjust a bipod leg length while maintaining a shooting position in multiple different shooting positions.

BACKGROUND

Several rifle bipods are available including Harris Engineering, Inc. Blackhawk Tactical, 9200 Cody Overland Park, Kans. 66215; Caldwell (Battenfeld Technologies), 1800 N RT 2, Columbia, Mo. 65202; Champion Range and Target (Vista Outdoors), 1 Vista Way, Anoka, Minn. 55303, NcStar 18031 Cortney Ct., Industry, Calif. 91748, Leapers UTG These devices have an adjustable bipod leg which is releasable by pushing rearward on a release ring assembly. By pushing rearward, a boss is released from a slot on the adjustable leg.

This allows the adjustable leg to descend to a desired length or retract back up the frame tube.

As shown in FIG. 3 (prior art) the shooter must reach forward and use the index finger F to push rearward in direction R on a ring release assembly A. The ring-shaped bracket 10 has a stopper S that is spring biased to seat in circular groove G1 of the adjustable leg 11. The bracket 10 has a downward facing flange B that the shooter depresses. The spring 12 provides the bias. The spring 12 and ring release assembly A all are housed in the housing H. The housing H can be locked along the frame tube 13 using a set screw 14. A (rubber) foot 15 attaches to the end of the adjustable leg 11.

Circular groove G2 would allow the adjustable leg 11 to be lengthened to raise the rifle (not shown).

The problem with this prior art ring release assembly A is that the shooter must often leave a shooting position and reach forward in order to reach the release bracket 10 of the ring release assembly A by pushing the flange B.

This problem is displayed in FIG. 1A where the shooter is using the present invention in the prior art manner with the present invention lever 100 not in use.

What is needed in the art is an improved ring release assembly that allows the shooter to maintain a shooting position, maintaining the scope on the target, while adjusting the height of the bipod. The present invention provides a rearward projecting lever that releases the adjustable leg with a touch of a finger while the shooter keeps the scope on the target.

SUMMARY OF THE INVENTION

The main aspect of the present invention is to replace a prior art ring release assembly with an improved design that provides a rearward facing lever that is in reach of a shooter's finger while the shooter maintains a shooting position. This improvement is realized in several shooting positions, including prone, sitting, and standing when a bipod is used.

Another aspect of the present invention is the use of a lever, providing mechanical advantage to reduce the amount of force required to activate the mechanism allowing bipod leg length adjustment.

Another aspect of the present invention is to allow the shooter to grasp with two fingers the lever and lift the bipod allowing the adjustable leg to descend without using the (right or left) trigger arm.

Another aspect of the present invention is to allow one finger to depress the lever while the trigger arm raises the bipod and rifle to allow the adjustable leg to descend.

Another aspect of the present invention is to provide a latch mechanism to put the lever in a neutral position.

Another aspect of the present invention is that the lever pulls the ring bracket from behind. This eliminates potential binding in the mechanism that sometimes occurs when pressing the ring bracket in the front. This results in much smoother and easier activation.

Another aspect of the present invention is to improve adjusting the bipod from the prone, sitting, and standing positions. When used in a sitting or standing position the rifle bipod would be set on a table, desk, railing, etc.

Another aspect of the invention allows the shooter to quickly adjust bipod legs while rifle is not in use (being held in a non-shooting position or held by a rifle sling) or being transitioned to the shooting position.

Other aspects of this invention will appear from the following description and appended claims, reference being made to the accompanying drawings forming a part of this specification wherein like reference characters designate corresponding parts in the several views.

The present invention(s) can be factory supplied as original equipment or be easily supplied as a retrofit assembly. For the retrofit mode the rubber foot is removed. Then a set screw that fastens the ring release assembly housing to the frame receiving tube is loosened. The ring release assembly is removed. The ring-shaped bracket 10 of FIG. 3 is removed. The present invention lever assembly is slid up the frame receiving tube. The original ring release assembly is slid up the frame receiving tube fastened at the proper height. The rubber foot is attached. Now the shooter can reach the lever when it is in the extended mode. The lever can be tilted up against the frame receiver tube into a neutral position.

BRIEF DESCRIPTION OF THE DRAWINGS

FIG. 7A is a bottom perspective view of a second latch embodiment in a transition mode.

FIG. 7B is the same view as FIG. 7A with the lever up in the neutral mode.

FIG. 9 is a side elevation view of a third latch embodiment, a clip.

FIG. 10 is a side elevation view of a spring plunger fourth latch embodiment.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1A:
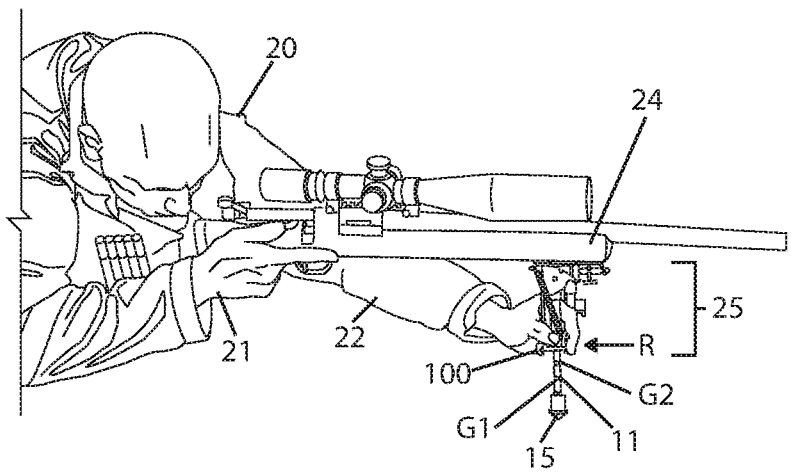
FIG. 1A is a side perspective view of a shooter reaching forward to use the present invention in the neutral mode not utilizing the lever. This is the same position required with the prior invention.
Figure 3:
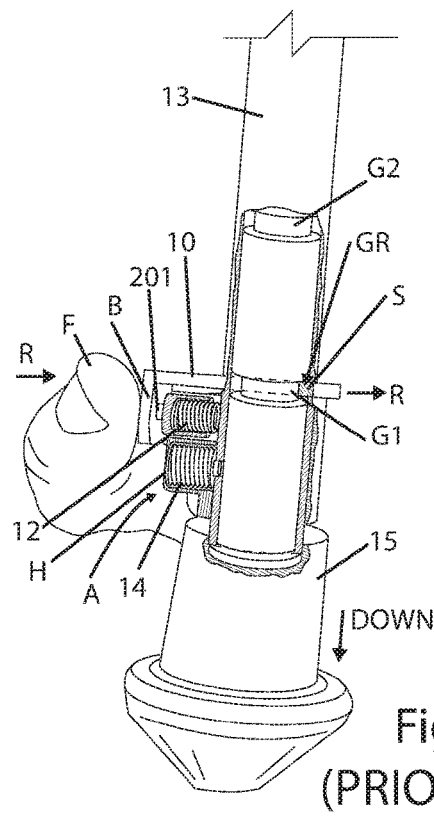
FIG. 3 (prior art) is a sectional view of a bipod leg.

Referring first to FIG. 1A a shooter 20 is in the prone position. His right arm 21 is his trigger arm.
His left arm 22 is adjusting the length of the adjustable bipod leg 11 in the traditional manner of reaching forward and pushing in, direction R, as shown in FIG. 3. The lever 100 is folded up into a neutral mode. The rifle is designated 24, and the improved bipod is designated 25.

Figure 1B:
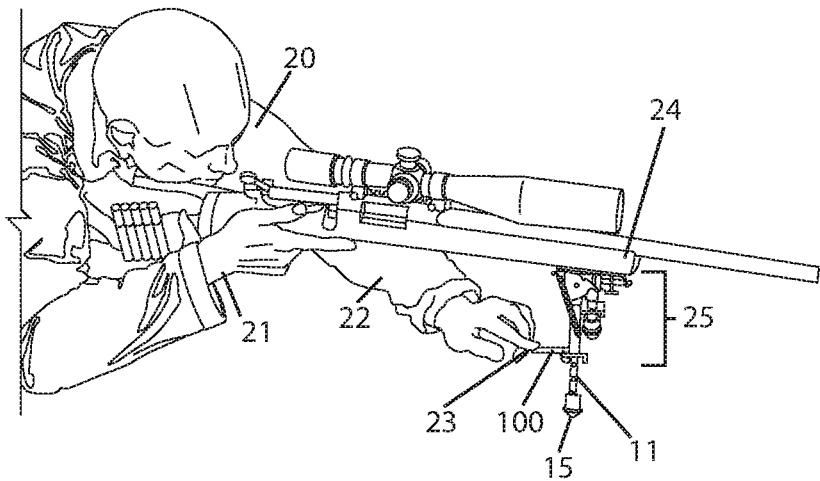
FIG. 1B is a side perspective view of the shooter maintaining the shooting position and using one finger to adjust the bipod height.

In FIG. 1B the lever 100 is folded down into the active mode. The shooter 20 can maintain his shooting position without reaching forward. His finger 23 can depress the lever 100 which releases the adjustable bipod leg 11. If he wants to shorten the length, he can just let the rifle 24 move down. If he wants to lengthen the adjustable bipod leg 11, he uses his right arm 21 to lift or tilt the rifle 24.

Figure 1C:
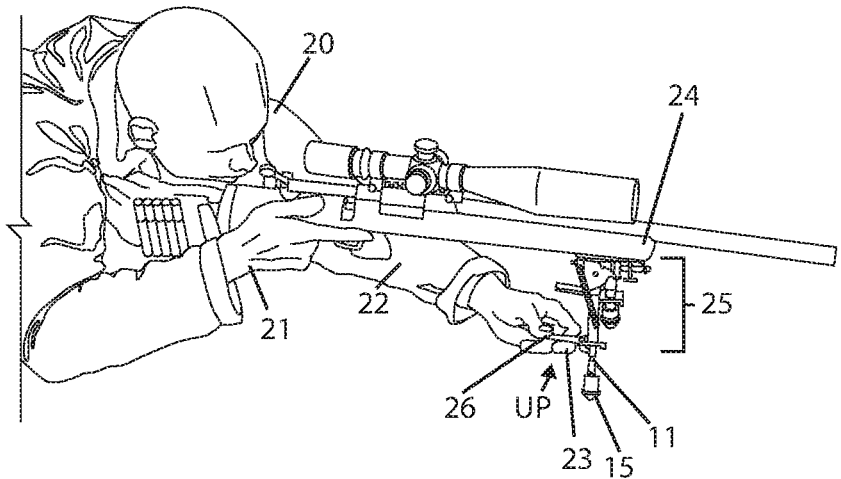
FIG. 1C is a side perspective view of the shooter maintaining the shooting position and gripping the lever to lift the tripod and allow the adjustable leg to descend.
Figure 2:
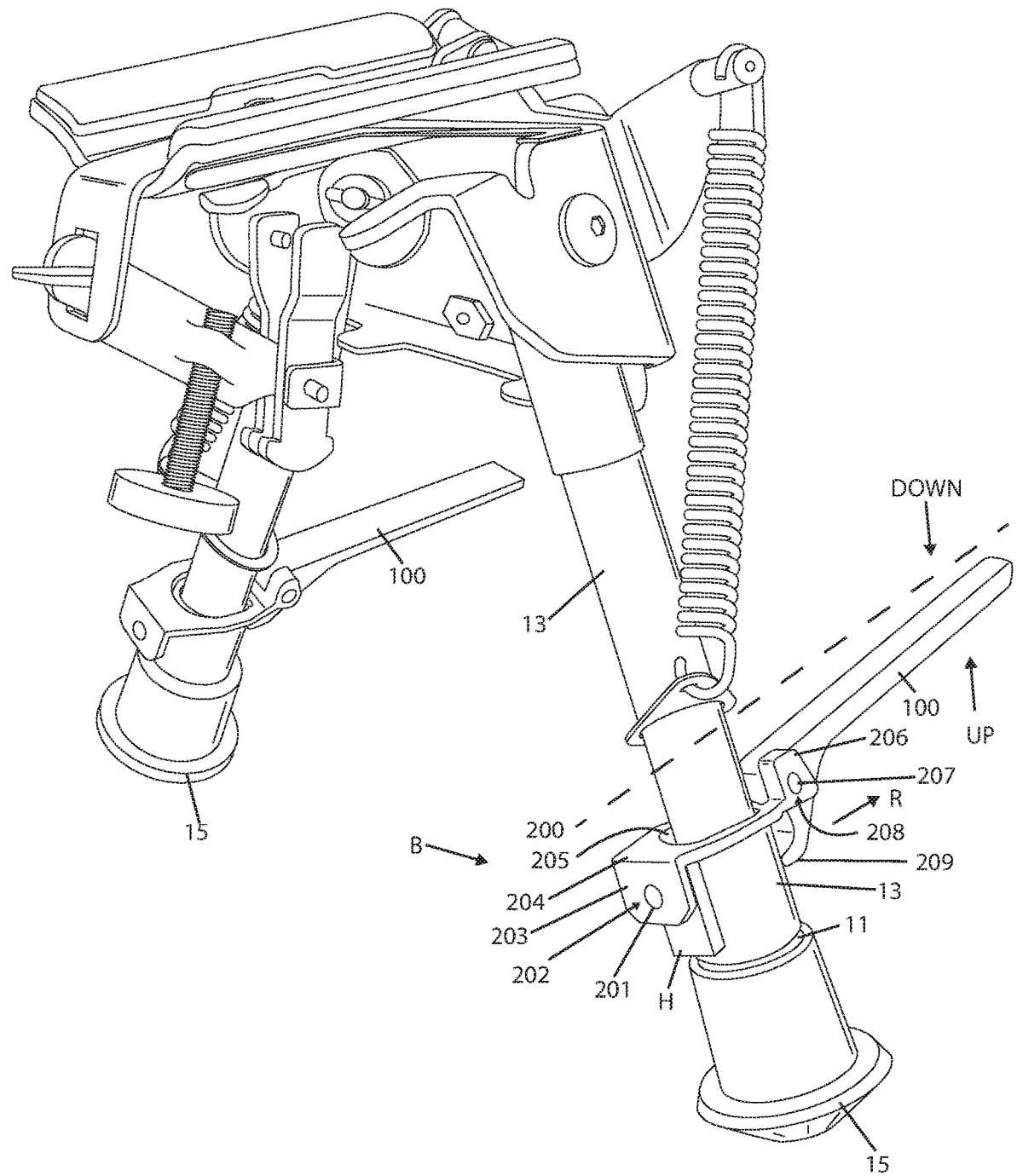
FIG. 2 is a front perspective view of the present invention installed on both legs of a tripod.

In FIG. 1C the shooter 20 is using his finger 23 and his thumb 26 to grasp the lever 100. He can now do two actions at once. First, he is depressing the lever 100 to release the adjustable bipod leg 11. Second, he can lift the rifle 24 in direction UP to lengthen the adjustable bipod leg 11 without using his right arm 21.

Referring next to FIGS. 2,4,5,8 all items above line 200 are prior art. The two bipod legs are identical in function. The prior art housing H shown in FIG. 3 is intact. The spring biased plunger 201 is shown in FIG. 3. The prior art groove GR runs horizontally at the rear of each frame tube 13. The stopper 210 slides in and out of the groove GR. The lever arm assembly B comprises a ring bracket 204 that has a hole 205 that encircles the frame tube 13. A forward lip 203 has a hole 202 that receives the prior art plunger 201. A rearward ear 206 has a pivot hole 208 to receive a pivot pin 207 which anchors pivot hole 211 (FIG. 8) of the lever 100 to ears 206. Thus, as the lever 100 is pushed down, DOWN, the foot 209 of lever 100 presses against frame tube 13. The pivot pin 207 draws the ears 206 rearward, direction R, which draws stopper 210 rearward and out of slots G1, G2 shown in FIG. 3.

Figure 4:
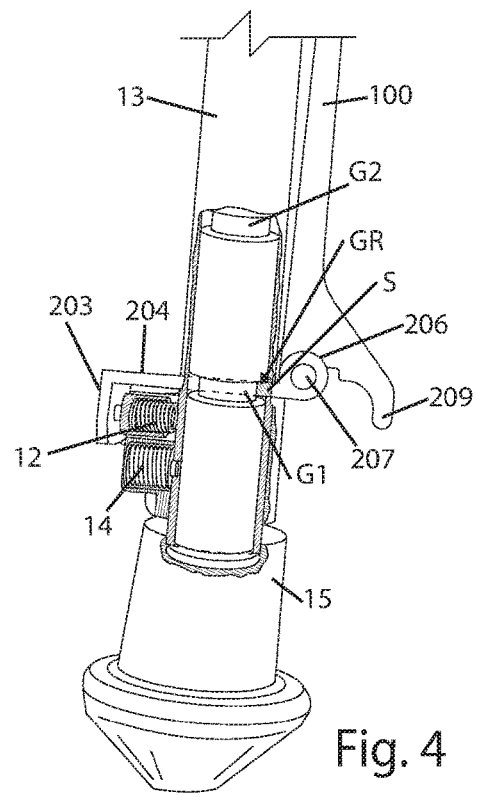
FIG. 4 is the same view as FIG. 3 with the present invention installed.
Figure 5:
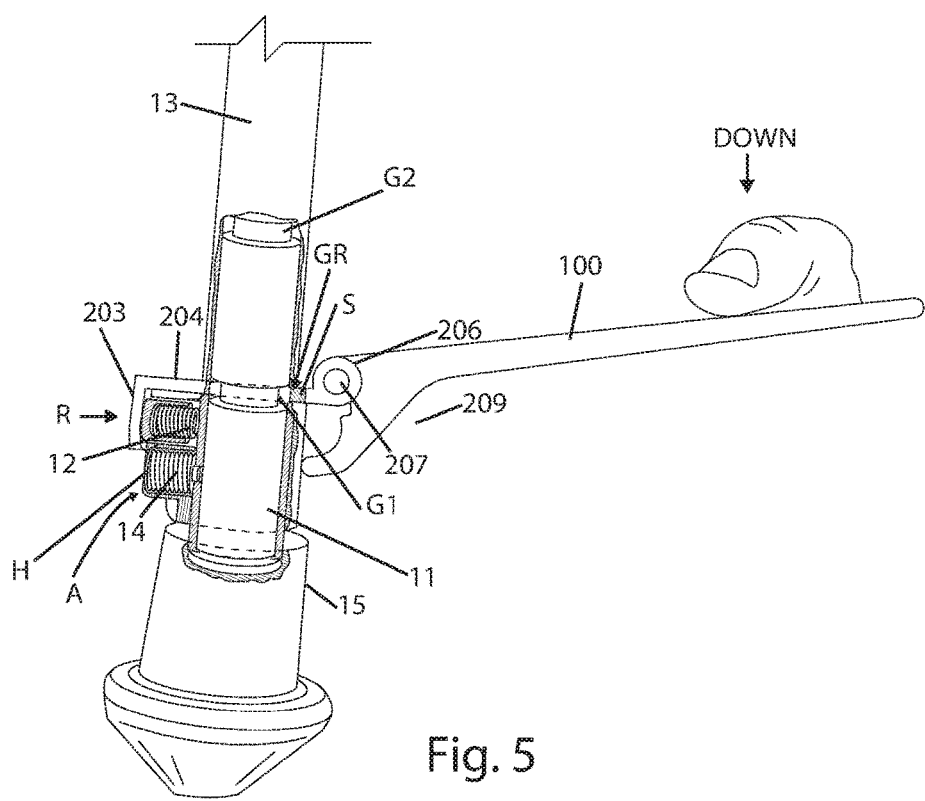
FIG. 5 is the same view as FIG. 4 with the lever extended to the active mode.

In FIG. 4 the lever 100 is folded up to the neutral mode. Several designs are disclosed to keep the lever 100 up in the neutral position. In this neutral position, the bipod leg length may be adjusted in the same manner as the prior art, by reaching around the bipod leg and pressing tab 203.

In FIGS. 6A,6B,6C, 8 a spring 603 has a boss 601 that latches into a recess 600 at the pivot end of lever 100.

Figure 6C:
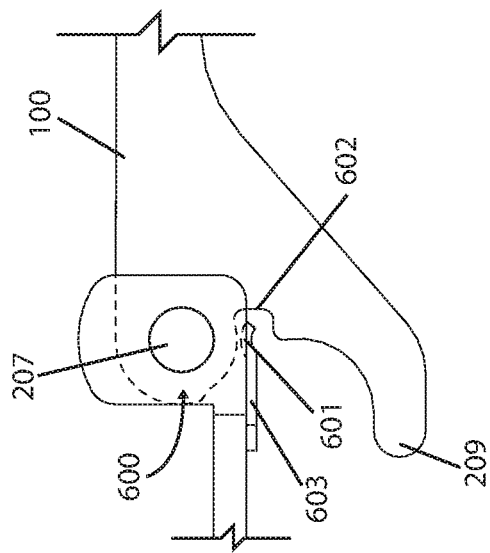
FIG. 6C is the same view as FIG. 6A with the lever in the active extended mode.
Figure 6B:
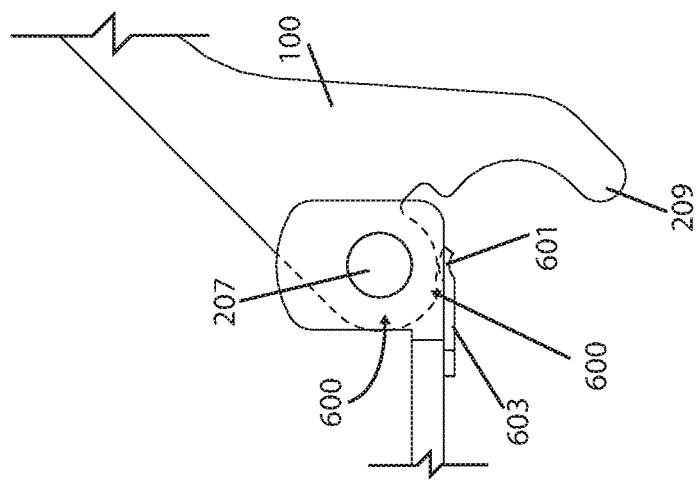
FIG. 6B is the same view as FIG. 6A with the lever in a transition mode.
Figure 6A:
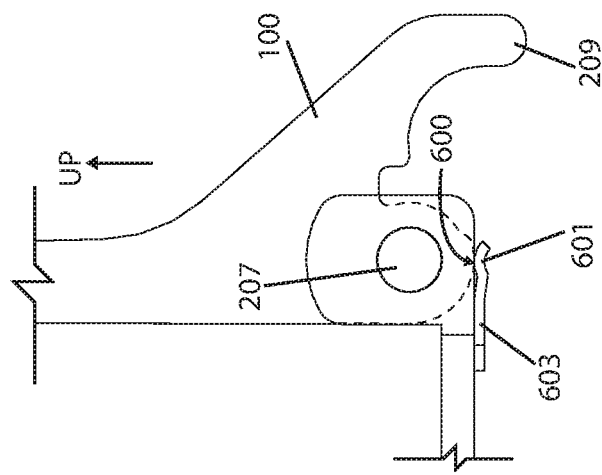
FIG. 6A is a side elevation view of a first latch embodiment in the neutral mode.
Figure 8:
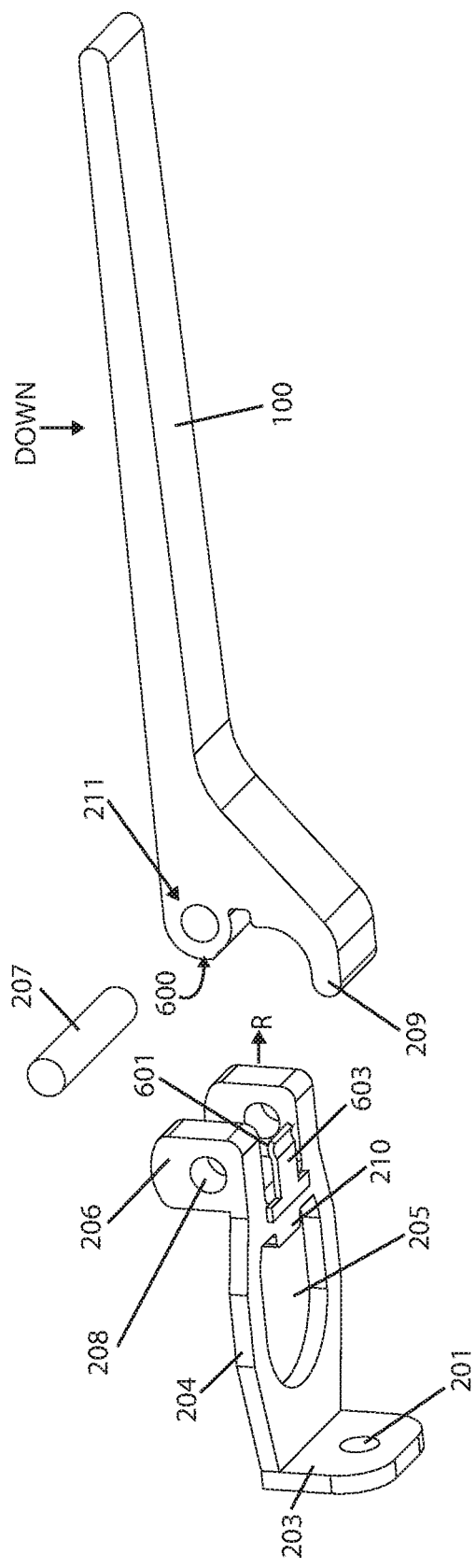
FIG. 8 is an exploded view of the embodiment shown in FIG. 6A.

In FIG. 6A the boss 601 is spring biased into recess 600. In FIG. 6B in transition the boss 601 has been released from recess 600. In FIG. 6C the lever 100 is in the active mode. A notch 602 allows the spring 603 to extend rearward.

In FIGS. 7A,7B the pivot end of lever 100 has a tooth 701. A deformable wire 700 extends under the ears 206. In FIG. 7B the tooth 701 has passed from left to right under the wire 700, and the wire 700 biases the tooth 701 to remain static with the lever 100 up in the neutral position. In FIG. 7A the shooter has started to lower the lever 100. The tooth 701 has snapped over the wire 700 from right to left.

In FIG. 9 a simple clip 900 is attached to the frame tube 13. Any type of clip can be used from a U-shaped clip to two separate arms connected to the frame tube 13.

In FIG. 10 the pivot end of lever 100 has a spring 1001 with a ball 1003 attached thereto. The ball 1003 protrudes out from the side of lever 100 to slide against the inside of the ear 206 when the lever is raised. The spring 1001 is anchored side to side in a hole in the pivot end of lever 100. An optional detent 1111 can catch the ball 1003 on the inside of the ear 206.

While a number of exemplifying features and embodiments have been discussed above, those of skill in the art will recognize certain modifications, permutations, additions and sub combinations thereof. No limitation with respect to the specific embodiments disclosed herein is intended or should be inferred.

We claim:

1. An improvement for a bipod for a rifle, the bipod having a pair of frame tubes each have an adjustable length leg, each leg having concentric locking grooves spaced apart to provide a selected length for the leg, the improvement comprising:
   a ring bracket surrounding the frame tube and having a forward located downward flange with a receiving hole for a plunger biased forward by a spring that is mounted in a housing attached to the frame tube;
   said ring bracket having a forward-facing stopper that protrudes through a horizontal groove on the frame tube to allow the stopper to engage a selected concentric locking groove on the adjustable leg;
   said spring biasing said plunger forward and biasing said stopper forward into the selected concentric locking groove;
   said ring bracket having a rearward located pivot assembly that supports a rearward extending lever;
   said lever having a lower foot that abuts the frame tube when the lever is depressed; and
   wherein the pivot assembly pulls the ring bracket and stopper rearward to release the stopper from the selected concentric locking groove when the lever is depressed.

2. The improvement of claim 1, wherein the rearward located pivot assembly further comprises a pair of ears on the ring bracket that support a pivot pin that mounts through a hole in the bipod leg end of the lever.

3. The improvement of claim 2, wherein the lever further comprises a side to side hole for a spring plunger that urges a ball against an inside of an ear in the ring bracket when the lever is pivoted up adjacent the frame tube, thereby securing the lever in an upward neutral mode.

4. The improvement of claim 1, wherein the housing further comprises a set screw on the housing to lock the housing on the frame tube.

5. The improvement of claim 1, wherein the ring bracket further comprises a spring with a boss that engages a recess on a forward face of the lower foot when the lever is pivoted up adjacent the frame tube, thereby securing the lever in an upward neutral mode.

6. The improvement of claim 1, wherein the frame tube further comprises a clip that secures the lever adjacent the frame tube in a neutral mode.

7. A bipod leg assembly comprising:
a frame tube that receives an adjustable length leg that has a plurality of grooves set at differing heights along the adjustable length leg;
a housing engaged along the frame tube and having a fastener to lock the housing onto the frame tube;
said housing having a forward-facing spring with a forward-facing plunger;
a ring bracket surrounding the frame tube and having a flange with a receiving hole for the plunger;
said ring bracket having a forward-facing stopper that protrudes through the frame tube to engage a selected groove of the adjustable length leg;
said spring biasing the stopper forward into said selected groove;
said ring bracket having a pivot mount for a proximal end of a lever;
wherein depressing a distal end of the lever overcomes said spring bias and releases the stopper from the selected groove; and
wherein the pivot mount further comprises a pair of ears supporting a pivot pin mounted through the proximal end of the lever.

8. The bipod assembly of claim 7, wherein the pivot mount further comprises a foot on the proximal end of the lever that abuts the frame tube when the distal end of the lever is depressed.

9. The improvement of claim 7, wherein the ring bracket further comprises a spring with a boss that engages a recess on a forward face of the lever when the lever is pivoted up adjacent the frame tube, thereby securing the lever in an upward neutral mode.

10. The improvement of claim 7, wherein the lever further comprises a side to side hole for a spring plunger that urges a ball against an inside of an ear on the ring bracket when the lever is pivoted up adjacent the frame tube, thereby securing the lever in an upward neutral mode.

11. A release lever for an adjustable length leg of a bipod, said release lever comprising:
a proximal end pivotally connected to a ring bracket secured around a frame tube of a bipod;
said ring bracket having a stopper that releasably engages one of a plurality of notches in the adjustable length leg;
said ring bracket having a spring that biases the stopper forward into the notches; and
said release lever having a distal end facing rearward which when depressed withdraws the stopper from the notches;
wherein the proximal end further comprises a foot that abuts the frame tube when the distal end of the release lever is depressed; and
wherein the pivotal connection further comprises a pair of ears on the ring bracket supporting a pivot pin through the proximal end of the release lever.

12. The release lever of claim 11, wherein the spring further comprises a housing that is releasably secured to the frame tube.

13. The improvement of claim 12, wherein the ring bracket further comprises a spring with a boss that engages a recess on a forward face of the lower foot when the lever is pivoted up adjacent the frame tube, thereby securing the lever in an upward neutral mode.

14. The improvement of claim 12, wherein the frame tube further comprises a clip that secures the lever upward adjacent the frame tube in a neutral mode.

15. The improvement of claim 12, wherein the lever further comprises a side to side hole for a spring plunger that forces a ball to engage an inside of an ear on the ring bracket when the lever is pivoted up adjacent the frame tube, thereby securing the lever in an upward neutral mode.

16. A bipod leg assembly comprising:
a frame tube that receives an adjustable length leg that has a plurality of grooves set at differing heights along the adjustable length leg;
a housing engaged along the frame tube and having a fastener to lock the housing onto the frame tube;
said housing having a forward-facing spring with a forward-facing plunger;
a ring bracket surrounding the frame tube and having a flange with a receiving hole for the plunger;
said ring bracket having a forward-facing stopper that protrudes through the frame tube to engage a selected groove of the adjustable length leg;
said spring biasing the stopper forward into said selected groove;
said ring bracket having a pivot mount for a proximal end of a lever;
wherein depressing a distal end of the lever overcomes said spring bias and releases the stopper from the selected groove; and
wherein the frame tube further comprises a clip that secures the lever upward adjacent the frame tube in a neutral mode.

17. A release lever for an adjustable length leg of a bipod, said release lever comprising:
a proximal end pivotally connected to a ring bracket secured around a frame tube of a bipod;
said ring bracket having a stopper that releasably engages one of a plurality of notches in the adjustable length leg;
said ring bracket having a spring that biases the stopper forward into the notches;
said release lever having a distal end facing rearward which when depressed withdraws the stopper from the notches; and
wherein the proximal end pivot connection further comprises a pivot of the release lever to a neutral mode parallel to the frame tube.

* * * * *